(12) United States Patent
Sasaki et al.

(10) Patent No.: US 11,300,654 B2
(45) Date of Patent: Apr. 12, 2022

(54) RADAR DEVICE

(71) Applicant: HITACHI AUTOMOTIVE SYSTEMS, LTD., Hitachinaka (JP)

(72) Inventors: Satoshi Sasaki, Hitachinaka (JP); Akira Kitayama, Hitachinaka (JP); Hiroshi Kuroda, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 449 days.

(21) Appl. No.: 16/345,988

(22) PCT Filed: Nov. 17, 2017

(86) PCT No.: PCT/JP2017/041429
§ 371 (c)(1),
(2) Date: Apr. 29, 2019

(87) PCT Pub. No.: WO2018/101082
PCT Pub. Date: Jun. 7, 2018

(65) Prior Publication Data
US 2020/0057135 A1     Feb. 20, 2020

(30) Foreign Application Priority Data
Dec. 1, 2016  (JP) ............................. JP2016-234073

(51) Int. Cl.
*G01S 7/292*     (2006.01)
*G01S 7/295*     (2006.01)
(Continued)

(52) U.S. Cl.
CPC .............. *G01S 7/292* (2013.01); *G01S 7/295* (2013.01); *G01S 7/354* (2013.01); *G01S 13/003* (2013.01);
(Continued)

(58) Field of Classification Search
CPC .......... G01S 7/292; G01S 7/295; G01S 7/354; G01S 13/931; H01Q 1/3233; H01Q 1/521; H01Q 21/064; H01Q 21/065
See application file for complete search history.

(56) References Cited

U.S. PATENT DOCUMENTS 3,274,590 A * 9/1966 Page .................... G01S 13/4445
342/80
4,357,608 A * 11/1982 Lewis .................... G01S 13/87
342/155

(Continued)

FOREIGN PATENT DOCUMENTS

DE          12 48 754 B       8/1967
JP          H09-288178 A     11/1997
(Continued)

OTHER PUBLICATIONS

International Search Report with English translation and Written Opinion issued in corresponding application No. PCT/JP2017/041429 dated Mar. 6, 2018.

(Continued)

*Primary Examiner* — Peter M Bythrow
(74) *Attorney, Agent, or Firm* — Foley & Lardner LLP

(57) ABSTRACT

The present invention provides a radar device capable of reducing processing load while arraying receiving antennas in two directions. In the present invention, a transmitting unit (transmitting antenna) transmits an electromagnetic wave. A plurality of receiving antennas 108 receive a reflected wave from an object which reflects the electromagnetic wave, and convert the reflected wave into a first signal Sig1. A plurality of receiving circuits 520 are respectively connected to the receiving antennas 108 and generate a second signal Sig2 from the first signal Sig1. A signal processing unit 103 processes the second signal Sig2. The plurality of receiving antennas 108 are arrayed in a first (Continued)

direction and a second direction crossing the first direction. The signal processing unit 103 switches the combination of the second signal Sig2 that is processed, for each frame indicating a time period extending from when the transmitting antenna transmits the electromagnetic wave to when the signal processing unit 103 processes the second signal Sig2.

12 Claims, 12 Drawing Sheets

(51) Int. Cl.
*G01S 7/35* (2006.01)
*G01S 13/00* (2006.01)
*G01S 13/931* (2020.01)
*H01Q 1/32* (2006.01)
*H01Q 1/52* (2006.01)
*H01Q 21/06* (2006.01)

(52) U.S. Cl.
CPC ......... *G01S 13/931* (2013.01); *H01Q 1/3233* (2013.01); *H01Q 1/521* (2013.01); *H01Q 21/064* (2013.01); *H01Q 21/065* (2013.01)

(56) References Cited

U.S. PATENT DOCUMENTS

| | | | | |
|---|---|---|---|---|
| 4,740,045 A * | 4/1988 | Goodson | ................ | G01S 13/60 342/112 |
| 5,189,426 A * | 2/1993 | Asbury | ................ | G01S 13/70 342/70 |
| 5,510,794 A * | 4/1996 | Asbury | ................ | G01S 13/56 342/42 |
| 5,933,109 A * | 8/1999 | Tohya | ................ | G01S 7/0235 342/175 |
| 6,087,974 A * | 7/2000 | Yu | ................ | F41G 7/2226 244/3.1 |
| 6,151,310 A * | 11/2000 | Dent | ................ | H01Q 21/08 370/330 |
| 6,246,365 B1 * | 6/2001 | Tokoro | ................ | G01S 13/42 342/427 |
| 7,145,503 B2 * | 12/2006 | Abramovich | .......... | H01Q 21/24 342/159 |
| 7,460,951 B2 * | 12/2008 | Altan | ................ | G01S 13/726 701/536 |
| 7,626,536 B1 | 12/2009 | Rihaczek | | |
| 7,978,120 B2 * | 7/2011 | Longstaff | ................ | G01S 13/48 342/22 |
| 7,994,965 B2 * | 8/2011 | Longstaff | .............. | G01S 13/347 342/59 |
| 8,305,258 B2 * | 11/2012 | Yamada | ................ | G01S 13/931 342/123 |
| 8,427,360 B2 * | 4/2013 | Longstaff | .............. | G01S 13/347 342/65 |
| 8,866,665 B2 * | 10/2014 | Suzuki | ................... | G08G 1/165 342/79 |
| 9,958,527 B2 * | 5/2018 | Tuxen | ....................... | G01S 3/14 |
| 10,191,148 B2 * | 1/2019 | Choi | ..................... | G01S 13/931 |
| 10,230,176 B2 * | 3/2019 | Natsume | ............. | G01S 13/584 |
| 10,718,863 B2 * | 7/2020 | Carswell | ............ | G01S 13/4454 |
| 10,775,477 B2 * | 9/2020 | Park | ....................... | H01Q 21/08 |
| 10,823,819 B2 * | 11/2020 | Loesch | ................ | G01S 13/931 |
| 10,871,562 B2 * | 12/2020 | Trummer | ............ | G01S 13/536 |
| 11,042,763 B2 * | 6/2021 | Ross | ..................... | G06K 9/6288 |
| 2002/0111149 A1 * | 8/2002 | Shoki | ................... | H01Q 3/2605 455/277.1 |
| 2012/0319888 A1 * | 12/2012 | Suzuki | ................. | G01S 13/345 342/107 |
| 2015/0223082 A1 * | 8/2015 | Negus | ................... | H04W 76/27 370/329 |
| 2015/0346323 A1 * | 12/2015 | Kollmer | ............... | G01S 7/4004 342/196 |
| 2016/0381591 A1 * | 12/2016 | Lysejko | ................ | H04W 88/04 370/252 |

FOREIGN PATENT DOCUMENTS

| | | |
|---|---|---|
| JP | H9-297173 A | 11/1997 |
| JP | 2002-237779 A | 8/2002 |
| JP | 2007-170818 A | 7/2007 |
| JP | 2008-292244 A | 12/2008 |
| JP | 2012-098107 A | 5/2012 |
| WO | WO-2007/026792 A1 | 3/2007 |
| WO | WO-2011/092813 A1 | 8/2011 |

OTHER PUBLICATIONS

Supplemental European Search Report issued in corresponding European Patent Application No. 17876393.4 dated Jul. 1, 2020.
Office Action issued in corresponding Japanese Patent Application No. 2018-553781 dated Nov. 4, 2020 with English translation.

* cited by examiner

| | | PERFORMANCE (Fr = FRAME) | | | | | LOAD | |
|---|---|---|---|---|---|---|---|---|
| | | DETECTION INFORMATION | | | | TIME PER FRAME | PROCESSING LOAD | DATA AMOUNT |
| | | DISTANCE | SPEED | HORIZONTAL DETECTION ANGLE | VERTICAL DETECTION ANGLE | | | |
| NUMBER OF CHANNELS USED | 2 | 2/Fr | 2/Fr | 0.5/Fr | 0.5/Fr | SHORT | SMALL | SMALL |
| | 3 | 3/Fr | 3/Fr | 1/Fr | 1/Fr | ↕ | ↕ | ↕ |
| | 4 | 4/Fr | 4/Fr | 2/Fr | 2/Fr | LONG | LARGE | LARGE |

AS FOR RECEIVING ANTENNA 108, IT IS ASSUMED THAT THIS APPLIES TO ALL HATCHED WITH SAME HATCHING IN FIGURE
FURTHER, CHAIN LINE IN RECEIVING ANTENNA IS CONNECTED TO CENTER POINT OF EACH RECEIVING ANTENNA IN HORIZONTAL DIRECTION AND VERTICAL DIRECTION AND INTERSECTION IS CENTER PORTION OF EACH RECEIVING ANTENNA

RADAR DEVICE

TECHNICAL FIELD

The present invention relates to a radar device.

BACKGROUND ART

Recently, a radar device is mounted on an automobile and is used as a safety device for collision prevention or travelling control. This in-vehicle radar device can detect a relative distance or a relative speed of a target object (such as a preceding vehicle) and can detect a position of a horizontal direction of the target object, in a configuration in which a plurality of receiving antennas are arrayed in the horizontal direction. Although the receiving antenna configuration in the horizontal direction is general, a receiving antenna configuration in which a plurality of receiving antennas are arrayed in a vertical direction is also known (for example, refer to PTL 1).

CITATION LIST

Patent Literature

PTL 1: JP 2002-237779 A

SUMMARY OF INVENTION

Technical Problem

In automatic driving or other wireless communication systems, the ability to detect a position of the vertical direction of the target object is required. Particularly, in future automatic driving, detection (measurement) of the position of the vertical direction of the target object is essential in view of the need for detecting signs or slipping through an elevated bridge and it is not possible to cope with it in the general receiving antenna configuration in which the receiving antennas are arrayed only in the horizontal direction. For this reason, it is necessary to constitute the receiving antennas in the vertical direction as well.

However, with an increase in the number of receiving antennas, an amount of received data increases and a mounting memory (cost), a processing amount, and power consumption increase.

An object of the present invention is to provide a radar device capable of reducing processing load while arraying receiving antennas in two directions.

Solution to Problem

In order to achieve the above object, a radar device according to the present invention includes a transmitting antenna which transmits an electromagnetic wave, a plurality of receiving antennas which receive a reflected wave from an object reflecting the electromagnetic wave and convert the reflected wave into a first signal, a plurality of receiving circuits which are respectively connected to the receiving antennas and generate a second signal from the first signal, and a signal processing unit which processes the second signal. The plurality of receiving antennas are arrayed in a first direction and a second direction crossing the first direction. The signal processing unit switches a combination of the second signal to be processed, for each frame indicating a time period extending from when the transmitting antenna transmits the electromagnetic wave to when the signal processing unit processes the second signal.

Advantageous Effects of Invention

According to the present invention, it is possible to reduce processing load while arraying receiving antennas in two directions. Problems, configurations, and effects other than those described above will be further apparent from the following description of embodiments.

DESCRIPTION OF EMBODIMENTS

Hereinafter, a configuration and an operation of a radar device according to each of first to fifth embodiments of the present invention will be described in detail with reference to the drawings. The radar device is used for collision prevention of a moving object or the like, for example, and extracts information on a relative distance or a relative speed with a target object by transmitting and receiving a frequency modulated radar wave.

First Embodiment

Figure 1:
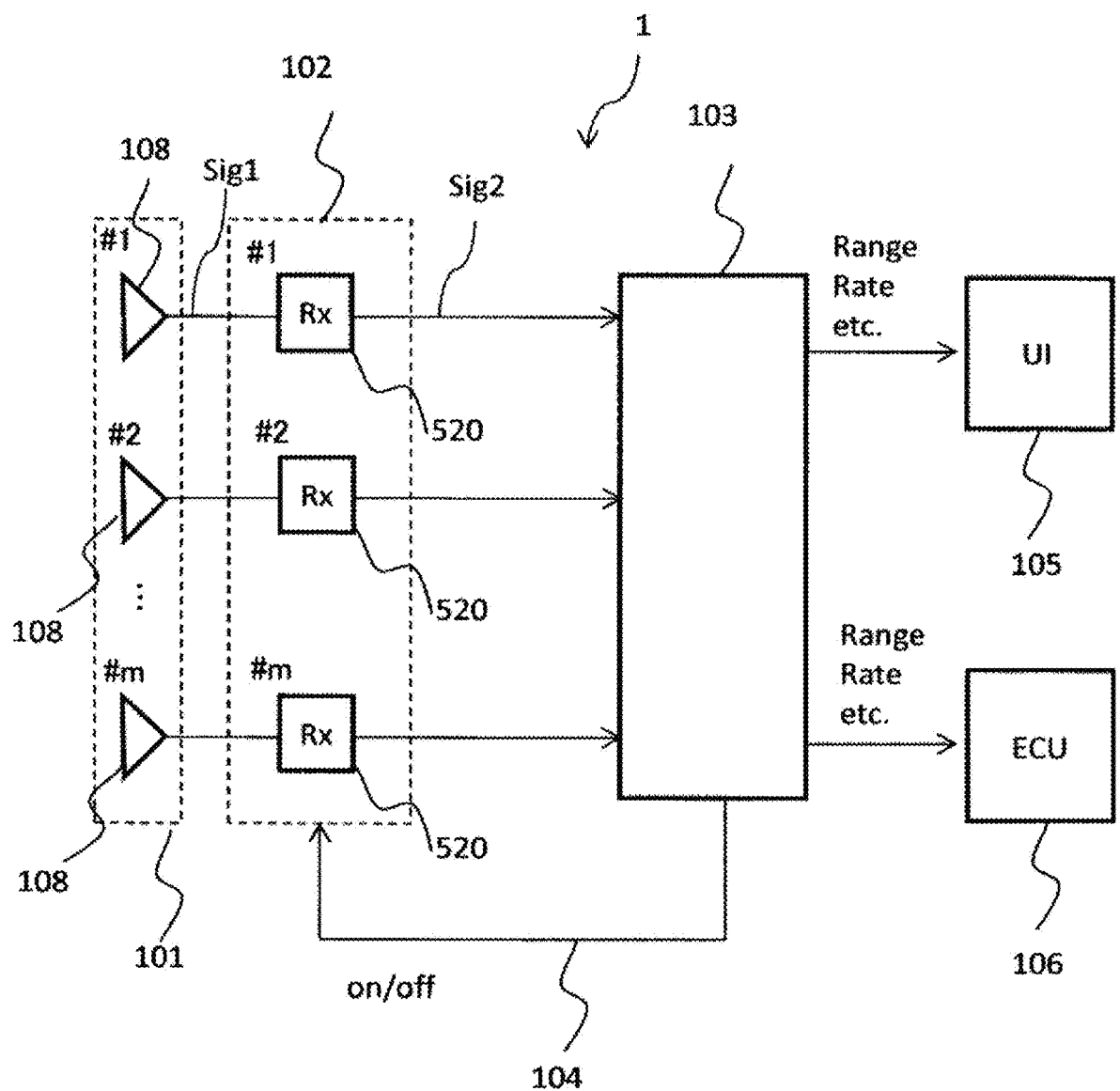
FIG. 1 is a block diagram showing a configuration of a receiver and a signal processing circuit of a radar device according to a first embodiment (all embodiments) of the present invention.

FIG. 1 is a block diagram showing a configuration of a receiver (a receiving antenna unit 101 and a receiving circuit unit 102) and a signal processing circuit (a signal processing unit 103) of a radar device 1 according to a first embodiment of the present invention and an output of a processing result, and is a block diagram of all embodiments including the other embodiments to be described later. The configuration of the radar device 1 shown in FIG. 1 is omitted for components (amplifiers and the like) that are not touched in the embodiment of the present invention. Further, an antenna form of a receiving antenna 108 is arbitrary and is not limited to a specific form (a patch antenna, a horn antenna, or the like).

An electromagnetic wave is radiated from a transmitting unit (not shown in the drawings) of the radar device 1 by any method and is reflected by an obstacle or the like. The reflected electromagnetic wave is input to the receiving antenna 108 provided in the receiving antenna unit 101.

The radar device 1 has m receiving antennas 108 and m receiving circuits 520 (Rx) connected thereto, and the signals input to each receiving antenna 108 is input to the signal processing unit 103 connected via each receiving circuit 520.

In other words, the transmitting unit (transmitting antenna) transmits the electromagnetic wave. A plurality of receiving antennas 108 receive a reflected wave from an object reflecting the electromagnetic wave and convert the reflected wave into a first signal Sig1. A plurality of receiving circuits 520 are respectively connected to the receiving antennas 108 and generate a second signal Sig2 from the first signal Sig1. The signal processing unit 103 processes the second signal Sig2. The configuration of the receiving circuit 520 is different depending on a radar system (a pulse system, an FMCW system, a 2-frequency CW system, or the like), but the receiving circuit 520 of any radar system may be used.

Here, each receiving antennas 108, each receiving circuit 520, signals input to the signal processing unit 103 via them, and signal processing using them are collectively referred to as a receiving channel for each receiving antenna. That is, the radar device 1 of FIG. 1 has m receiving channels.

Each receiving channel is configured to regularly switch any receiving circuit 520 to on and off by a switching signal 104.

In other words, the signal processing unit 103 switches a combination of the second signal Sig2 to be processed, for each frame indicating a time period extending from when the transmitting antenna transmits the electromagnetic wave to when the signal processing unit 103 processes the second signal Sig2. Thereby, the processing load for each frame is reduced.

However, a method of switching the receiving channel is not limited to this. For example, the receiving channel may be switched by a method of switching the receiving antenna 108 so as not to operate or a method of causing a signal from the receiving channel input to the signal processing unit 103 not to be processed. That is, a configuration in which a signal received by each receiving antenna is not processed by the signal processing unit may be used.

For example, a signal processing circuit such as a microcomputer and an FPGA is mounted in the signal processing unit 103 and processes an input signal from the receiving channel. A user interface 105 (UI) and a vehicle control unit 106 are connected to the signal processing unit 103. Information such as a relative distance Range (distance between the radar device 1 and an object in front of the radar device 1) and a relative speed Rate (relative speed of the object in front of the radar device 1 to the radar device 1) calculated by the signal processing unit 103 may be input to the user interface 105 such as a vehicle navigation system and the vehicle control unit 106.

The user interface 105 or the vehicle control unit 106 and the signal processing unit 103 may be connected by wired connection using a cable or wireless connection using a wireless local area network (LAN) or the like.

The user interface 105 has a function of visually and aurally outputting information according to the information input from the signal processing unit 103, and the vehicle control unit 106 (for example, an electronic control unit (ECU) has a function of controlling an operation of the moving object such as power train control and vehicle body control according to the information input from the signal processing unit 103.

The vehicle control unit 106 recognizes a position of an obstacle or the like and a distance to the obstacle or the like by the signal output from the signal processing unit 103 and outputs a control signal to a power train control unit or a vehicle body control unit, thereby controlling the operation of the moving object according to a peripheral situation. In this way, an in-vehicle system according to the present embodiment functions as a driving support system.

The configuration of the radar device 1 shown in FIG. 1 is an example and the configuration is not limited to this. As described above, a configuration that includes an antenna transmitting and receiving an electromagnetic wave, has a method (mechanism/device/circuit) capable of regularly switching each receiving channel at any timing, and includes a device processing a received signal may be used.

In other words, for each frame, the signal processing unit 103 blocks at least one of receiving channels indicating paths from the respective receiving antennas 108 to the signal processing unit 103 and switches a combination of the second signals Sig2 to be processed.

As described above, according to the present embodiment, it is possible to reduce the processing load while arraying the receiving antennas in two directions.

Second Embodiment

Next, an example of an antenna used in a radar device 1 according to a second embodiment of the present invention will be described using FIGS. 2 and 3. In the present embodiment, a configuration of a transmitting/receiving horn antenna is shown, but an antenna configuration and the number of antennas that can be used in the embodiment of the present invention are not limited to this. For example, an antenna configuration such as an array antenna may be used. When the antenna is mounted on the radar device 1, it is possible to radiate and receive an electromagnetic wave as electrical information, and it is possible to implement a radar configuration provided with a configuration (device/circuit) that regularly switches the receiving channel like the switching signal 104.

Figure 2:
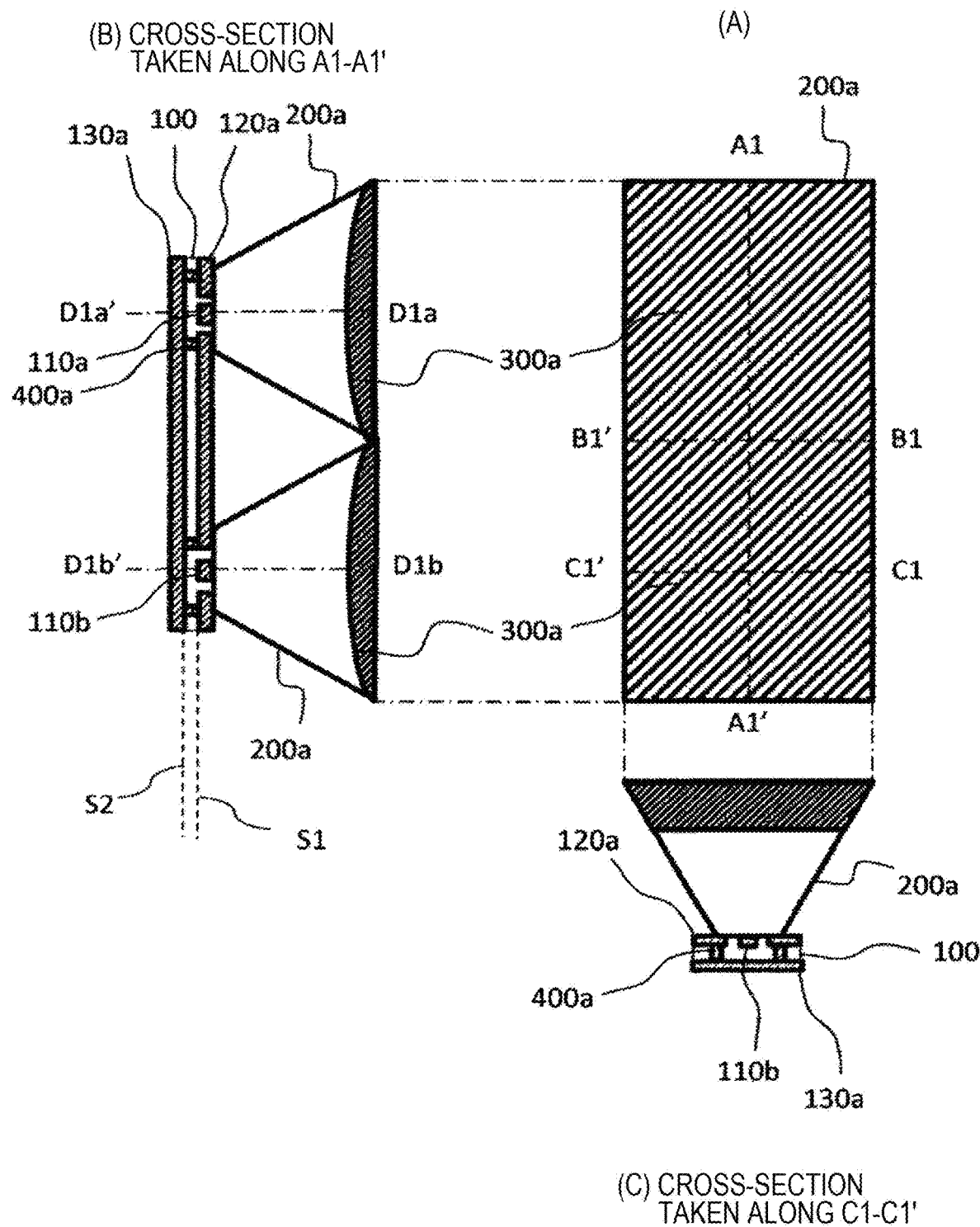
FIG. 2 is a diagram showing a configuration of an antenna of a radar device according to a second embodiment of the present invention.
Figure 3:
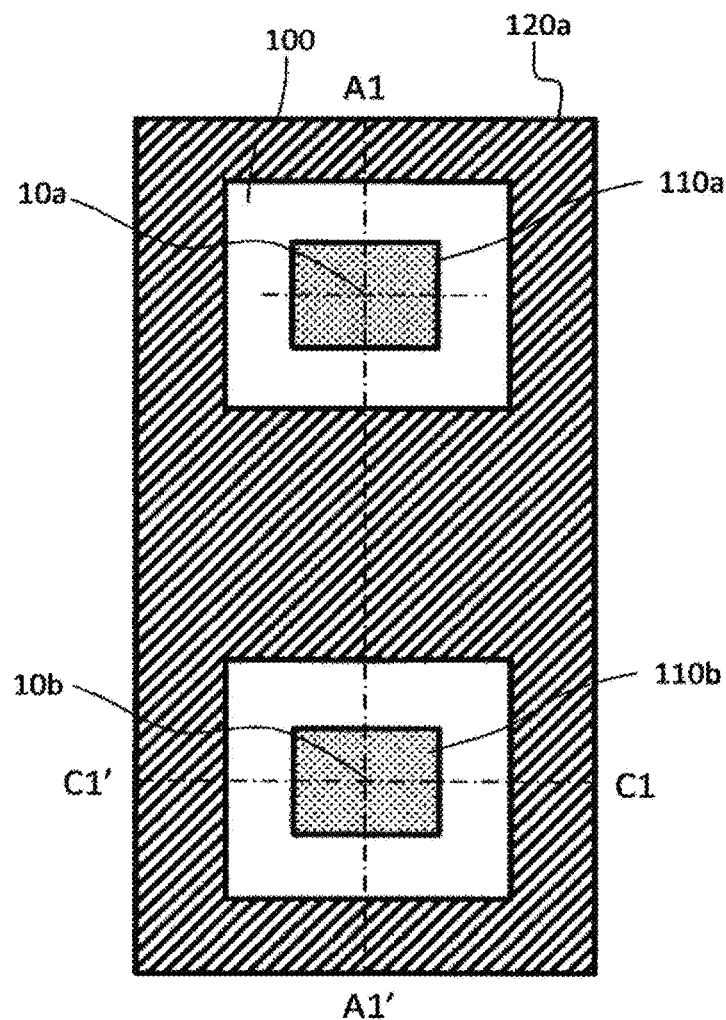
FIG. 3 is a diagram showing a configuration of an antenna of a radar device according to a second embodiment of the present invention.

FIGS. 2 and 3 are structural diagrams of a flat beam generating array antenna used in the radar device 1 according to the second embodiment of the present invention.

In the antenna shown in FIGS. 2 and 3, a first radiating unit 110a and a second radiating unit 110b are formed on a first surface S1 of a dielectric substrate 100. Further, a first conductor portion 120a is formed on the first surface S1 of the dielectric substrate 100 and a second conductor portion 130a is formed on a second surface S2 opposite to the first surface S1 of the dielectric substrate 100. Further, a through-hole 400a is formed to electrically connect a conductor of the first surface S1 of the dielectric substrate 100 and a conductor of the second surface S2.

A first horn 200a of which at least an the inner surface is formed of a conductor is attached to the side of the first surface S1 of the dielectric substrate 100 and a first dielectric lens 300a is disposed in the vicinity of a radiation side opening of each first horn 200a. By this configuration, antennas according to embodiments to be described later radiate a radio wave substantially in parallel with a first optical axis D1a-D1a' and a second optical axis D1b-D1b' of the first dielectric lens 300a.

A first virtual line (longitudinal center line) A1-A1' is a line passing through the center of the radiation side opening of the first horn 200a and having a shortest length, and a second virtual line (horizontal center line) B1-B1' is a line passing through the center of the first virtual line A1-A1' and orthogonal to the first virtual line A1-A1'.

In the antenna according to the present embodiment, one half (that is, a length of one radiation side opening in an A1-A1' direction) of the first virtual line A1-A1' is longer than the second virtual line B1-B1'. That is, in the present embodiment, the radiation side opening of the first horn 200a has a rectangular shape in which a direction (longitudinal direction) of the first virtual line A1-A1' is longer than a direction (transverse direction) of the second virtual line B1-B1'.

A third virtual line C1-C1' is a line passing through an intersection of the first virtual line A1-A1' and the second optical axis D1b-D1b' and orthogonal to the first virtual line A1-A1'.

FIG. 2(A) shows a shape of the antenna according to the present embodiment as viewed from the radiation side opening of the first horn 200a. Further, FIG. 2(B) shows a cross-sectional shape along the first virtual line A1-A1' of the antenna. Further, FIG. 2(C) shows a cross-sectional shape of the antenna according to the present embodiment along the third virtual line C1-C1'.

FIG. 3 shows a shape of the dielectric substrate 100 as viewed from the side of the first surface S1.

In the first surface S1 of the dielectric substrate 100, the first conductor portion 120a is formed to surround the first radiating unit 110a and the second radiating unit 110b at a constant distance from the first radiating unit 110a and the second radiating unit 110b. The first conductor portion 120a is electrically connected to the second conductor portion 130a formed on the second surface S2 of the dielectric substrate 100 via the through-hole 400a (FIG. 2).

Thereby, the first conductor portion 120a and the second conductor portion 130a function as reference potential surfaces of the first radiating unit 110a and the second radiating unit 110b, and each of the first radiating unit 110a and the second radiating unit 110b operates as a patch antenna and radiates an electromagnetic wave from the side of the first surface S1 of the dielectric substrate 100.

Furthermore, a radiation source side opening that is located at the side opposite to a radio wave traveling direction of the radiation side opening of the first horn 200a is disposed on the side of the first surface S1 of the dielectric substrate 100 so as to include one first radiating unit 110a and one second radiating unit 110b. That is, the first horn 200a has two horn shapes that are symmetrical (upper and lower) about the second virtual line B1-B1'.

As described above, the antenna according to the present embodiment is configured to include the first radiating unit 110a, the second radiating unit 110b, and the two first horns 200a.

An interval at which the through-holes 400a are disposed is preferably shorter than one fourth of a wavelength of the electromagnetic wave used in the dielectric substrate 100.

Furthermore, the first horn 200a is electrically connected to the first conductor portion 120a, so that a potential of the first horn 200a can become equal to a reference potential of the first radiating unit 110a and the second radiating unit 110b. Therefore, the electromagnetic waves radiated from the first radiating unit 110a and the second radiating unit 110b can be efficiently transmitted to the first horn 200a.

Furthermore, by disposing the first dielectric lenses 300a having convex shapes in the direction of the radiation source side opening in the radiation side opening of the first horn 200a, a length of the radiation side opening from the radiation source side opening of the first horn 200a can be shortened and the antenna can be miniaturized. The first dielectric lenses 300a are formed in continuous convex shapes of the same number as the radiating units 110a and 110b in the direction of the first virtual line A1-A1'.

That is, the two first dielectric lenses 300a of the antenna are continuously disposed in the direction of the first virtual line A1-A1' and have convex shapes symmetrical (upper and lower) to each other with the second virtual line B1-B1' as an axis. Furthermore, the first radiating unit 110a and the second radiating unit 110b are disposed at positions approximately matched with a focal position of the first dielectric lens 300a. A diameter of the convex portion constituting the first dielectric lens 300a is longer than a dimension in the direction along the third virtual line C1-C1' in the surface of the radiation side opening of the first horn 200a.

By the above structure, the diameter of the first dielectric lens 300a is reduced to half the diameter in the case where the first dielectric lens 300a has one convex shape. Here, since the diameter of the dielectric lens and the focal distance are generally in an approximately proportional relation, the focal distance of the first dielectric lens 300a is shortened to approximately half and the first dielectric lens 300a can be miniaturized (reduced in size) in an electromagnetic wave radiation direction (direction of the first optical axis D1a-D1a' or the second optical axis D1b-D1b').

Further, the first dielectric lens 300a is formed in a shape of a cylinder that is hyperbolic in the direction of the first virtual line A1-A1' and is linear in the direction of the second virtual line B1-B1'. As a result, it is possible to suppress side lobes of the beam radiated from the first dielectric lens 300a in the direction of the first virtual line A1-A1' and the direction of the second virtual line B1-B1'.

In the direction of the first virtual line A1-A1', a center 10a (FIG. 3) of the first radiating unit 110a is preferably disposed at an intersection of the first optical axis D1a-D1a' of the first dielectric lens 300a and the first surface S1 of the dielectric substrate 100 and a center 10b of the second radiating unit 110b is preferably disposed at an intersection of the second optical axis D1b-D1b' of the first dielectric lens 300a and the first surface S1 of the dielectric substrate 100. Next, the operation of the antenna according to the present embodiment will be described. A spherical electromagnetic wave radiated from the first radiating unit 110a propagates through the first horn 200a, is input to the first dielectric lens 300a, propagates through the first dielectric lens 300a, and is radiated to a space. During the propagation, the spherical wave is converted into a plane wave by the first horn 200a and the first dielectric lens 300a. Similarly, the spherical electromagnetic wave radiated from the second radiating unit 110b propagates through the first horn 200a. During the propagation, the spherical wave is converted into a plane wave by the first horn 200a and the first dielectric lens 300a.

Furthermore, a planar electromagnetic wave originating from the first radiating unit 110a and radiated from the first horn 200a and a planar electromagnetic wave originating from the second radiating unit 110b and radiated from the first horn 200a are synthesized in a space outside the radiation side opening of the first horn 200a and are radiated as a planar electromagnetic wave.

By this operation, the antenna according to the present embodiment can radiate a directional beam in a desired direction.

Furthermore, the antenna according to the present embodiment has a structure in which two horns are connected in the longitudinal direction and one half of the first virtual line A1-A1' (length of the radiation side opening of one horn in the direction of the first virtual line A1-A1') is longer than the second virtual line B1-B1'. That is, in one dielectric lens 300a (a portion of the dielectric lens corresponding to one radiating unit) provided on the radiation side of the antenna, the length in the direction of the first virtual line A1-A1' is longer than the length in the direction of the second virtual line B1-B1').

In the antenna according to the present embodiment, the first virtual line A1-A1' is disposed in the longitudinal direction (vertical direction) and the second virtual line B1-B1' is disposed in the transverse direction (horizontal direction, specifically, the vehicle width direction). For this reason, as a shape of the beam radiated from the first horn 200a, a flat beam is generated in which a width in the direction (transverse direction) of the second virtual line B1-B1' is larger than a width in the direction (longitudinal direction) of the first virtual line A1-A1'.

An electric field surface direction (E surface direction) of the electromagnetic waves radiated from the first radiating unit 110a and the second radiating unit 110b is parallel to the first virtual line A1-A1', so that the shape of the beam radiated from the first horn 200a is likely to be narrowed in the direction of the first virtual line A1-A1', which is preferable.

(Receiving Side)

Figure 4:
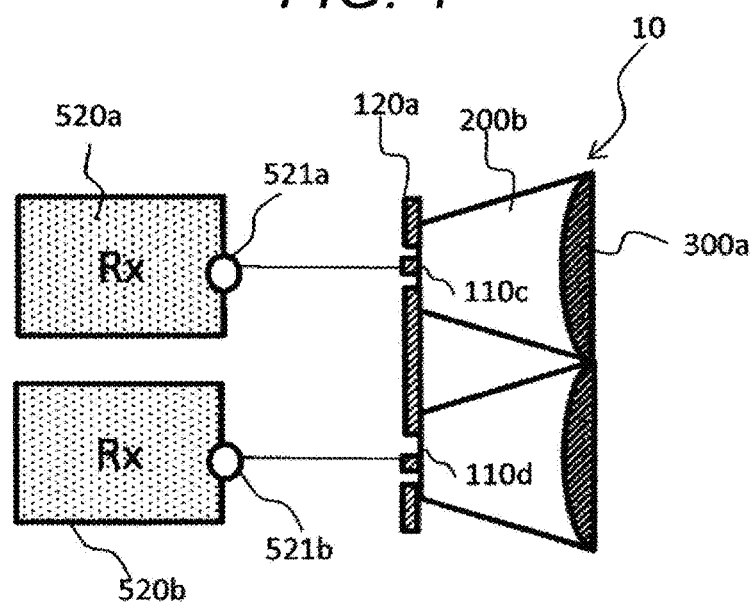
FIG. 4 is a block diagram of a receiving antenna of a radar device according to a second embodiment of the present invention.

FIG. 4 is a block diagram of the receiving side of the radar device 1 having the flat beam generating array antenna shown in FIG. 2. An example of the receiving side of the radar device 1 having the flat beam generating array antenna will be described below.

The radar device 1 shown in FIG. 4 has a flat beam generating array antenna 10, a first receiving circuit 520a, and a second receiving circuit 520b. The first receiving circuit 520a has a first input terminal 521a to which the third radiating unit 110c is connected and the second receiving circuit 520b has a second input terminal 521b to which the fourth radiating unit 110d is connected.

Next, an operation of the receiving antenna of the radar device 1 according to the present embodiment will be described. The electromagnetic wave input to the first dielectric lens 300a is converted into an electrical signal in the third radiating unit 110c via the first dielectric lens 300a and is input to the first input terminal 521a of the first receiving circuit 520a. At the same time, the electromagnetic wave input to the first dielectric lens 300a is converted into an electrical signal in the fourth radiating unit 110d via the first dielectric lens 300a and is input to the second input terminal 521b of the second receiving circuit 520b.

The receiving antenna of the radar device 1 having the flat beam generating array antenna according to the present embodiment is applicable to the radar device 1 that measures a distance to an obstacle or the like and a relative speed of the obstacle or the like. Furthermore, since the flat beam generating array antenna according to the embodiment of the present invention generates a flat beam of which beam width in the longitudinal direction is wider than the beam width in the lateral direction as described above, it is applicable to the radar device 1 that measures a vertical position (angle from a horizontal surface) of the obstacle or the like in the vertical direction (the direction of the first virtual line A1-A1' (not shown in FIG. 4)).

In the present embodiment, the flat beam generating array antenna 10 has been exemplified as the receiving antenna 108. However, the following simple configuration may be used. For example, each of the receiving antennas 108 has one radiating unit (patch antenna) that radiates the electromagnetic wave, one horn antenna that surrounds the radiating unit, and one dielectric lens that is disposed in an opening end of the horn antenna and converts the electromagnetic wave into a plane wave.

(Transmitting Side+Receiving Side)

Figure 5:
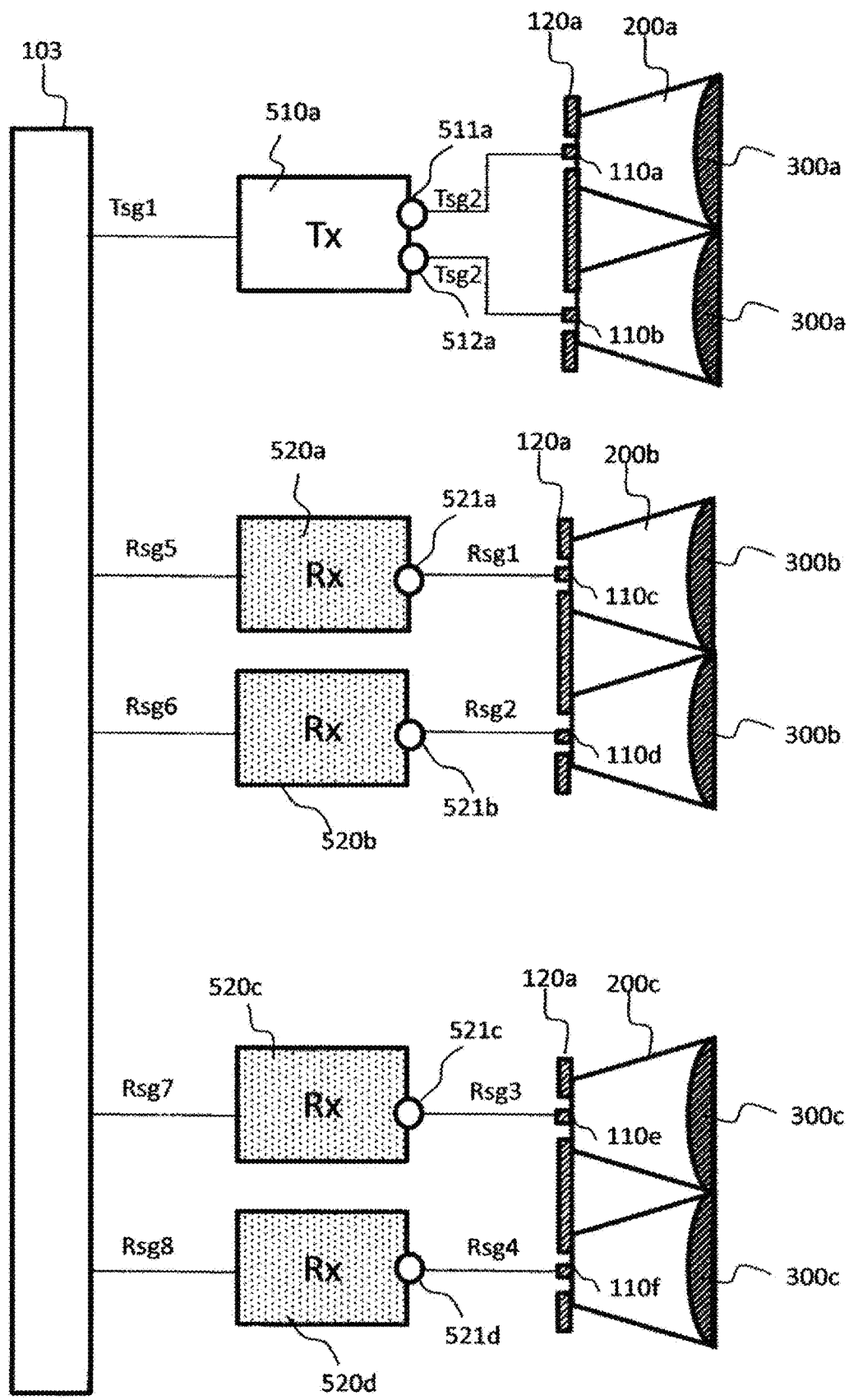
FIG. 5 is a block diagram of a radar device with a flat beam generating antenna according to a second embodiment of the present invention.

FIG. 5 is a block diagram of the radar device 1 having the flat beam generating array antenna shown in FIG. 2. Here, an example of the radar device 1 having the signal processing unit 103 will be described.

The signal processing unit 103 is connected to a first transmitting circuit 510a, a first receiving circuit 520a, a second receiving circuit 520b, a third receiving circuit 520c, and a fourth receiving circuit 520d.

The signal processing unit 103 supplies a signal to be transmitted from the antenna to the first transmitting circuit 510a and processes signals output from the first receiving circuit 520a, the second receiving circuit 520b, the third receiving circuit 520c, and the fourth receiving circuit 520d.

Next, operations of a transmitting unit and a receiving antenna unit of the radar device 1 according to the present embodiment will be described. A first transmitted signal Tsg1 output from the signal processing unit 103 and input to the first transmitting circuit 510a is output as a second transmitted signal Tsg2 from a first terminal 511a of the first transmitting circuit 510a. Further, the first transmitted signal Tsg1 is input to the first radiating unit 110a and is radiated as a transmitted electromagnetic wave from the first dielectric lens 300a. Similarly, a second transmitted signal Tsg2 output from a second terminal 512a of the first transmitting circuit 510a is input to the second radiating unit 110b and is radiated as a transmitted electromagnetic wave from the first dielectric lens 300a.

The transmitted electromagnetic wave radiated from the first dielectric lens 300a is reflected by the obstacle or the like.

The reflected electromagnetic wave is converted into a first received signal Rsg1 in the third radiating unit 110c via the second dielectric lens 300b and is further input to the first input terminal 521a of the first receiving circuit 520a. The first received signal Rsg1 is output as a fifth received signal Rsg5 from the first receiving circuit 520a and is input to the signal processing unit 103.

At the same time, the reflected electromagnetic wave is converted into a second received signal Rsg2 in the fourth radiating unit 110d via the second dielectric lens 300b and is further input to the second input terminal 521b of the second receiving circuit 520b. The second received signal Rsg2 is output as a sixth received signal Rsg6 from the second receiving circuit 520b and is input to the signal processing unit 103.

At the same time, the reflected electromagnetic wave is converted into a third received signal Rsg3 in the fifth radiating unit 110e via the third dielectric lens 300c and is further input to the third input terminal 521c of the third receiving circuit 520c. The third received signal Rsg3 is output as a seventh received signal Rsg7 from the third receiving circuit 520c and is input to the signal processing unit 103.

At the same time, the reflected electromagnetic wave is converted into a fourth received signal Rsg4 in the sixth radiating unit 110f via the third dielectric lens 300c and is further input to the fourth input terminal 521d of the fourth receiving circuit 520d. The fourth received signal Rsg4 is output as an eighth received signal Rsg8 from the fourth receiving circuit 520d and is input to the signal processing unit 103.

The signal processing unit 103 synthesizes and processes the signals output from the first receiving circuit 520a, the second receiving circuit 520b, the third receiving circuit 520c, and the fourth receiving circuit 520d. That is, the radar device 1 according to the present embodiment has one transmitting channel and four receiving channels and processes signals corresponding to the four receiving channels.

The transmitting/receiving antenna of the radar device 1 having the flat beam generating array antenna according to the present embodiment can measure a vertical position (angle from a horizontal surface) of an obstacle or the like in the vertical direction (the direction of the first virtual line A1-A1') and a horizontal position (angle from a frontal direction) of an obstacle or the like in the horizontal direction (the direction of the third virtual line C1-C1'). The details will be described later using to FIGS. 6 to 8.

(2×2 Receiving Antenna)

Figures 6, 7:
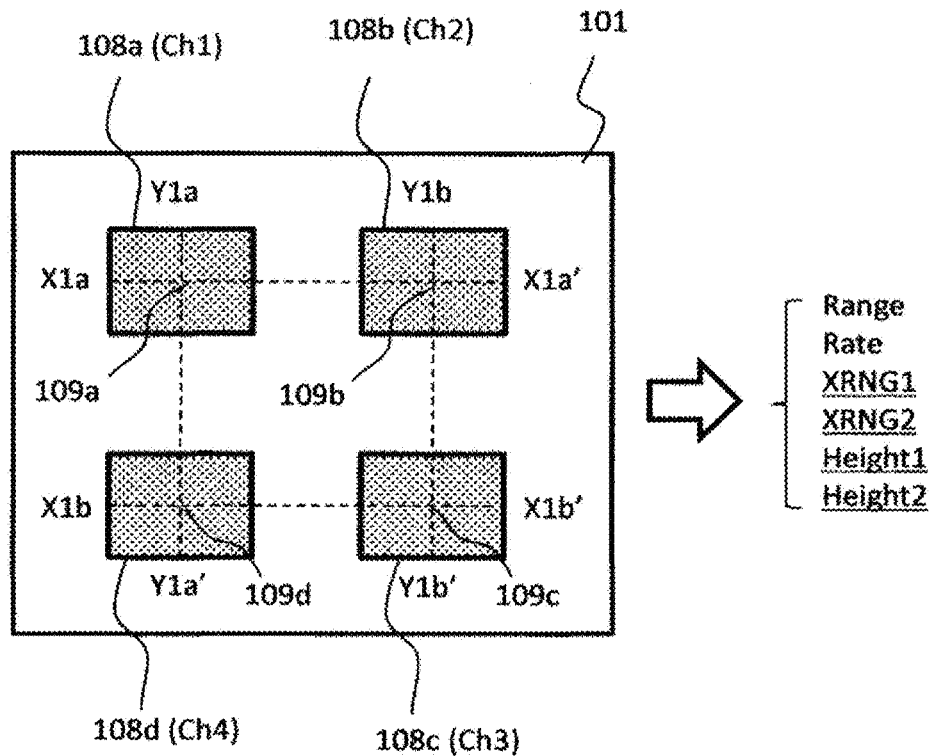
FIG. 6 is an explanatory diagram showing a configuration of a receiving antenna according to a second embodiment of the present invention.
FIG. 7 is an explanatory diagram showing a relation between radar performance and processing load with respect to the number of receiving channels used, in a radar device according to a second embodiment of the present invention.

FIG. 6 is diagram showing the radar device 1 having four receiving channels in which receiving antennas of two elements are disposed in the horizontal direction and receiving antennas of two elements are disposed in the vertical direction, as viewed from the top surface (front) of the antenna. An interval of the receiving antennas in each configuration direction of each receiving antenna 108 (108a to 108d) is constant. X1 (X1a, X1a', X1b, and X1b') and Y1 (Y1a, Y1a', Y1b, and Y1b') of each receiving antenna are centers of the receiving antenna in the vertical direction (height) and the horizontal direction (width), respectively.

X1a-X1a' and X1b-X1b' are parallel and Y1a-Y1a' and Y1b-Y1b' are parallel. Or, X1-X1' (X1a-X1a' and X1b-X1b') and Y1-Y1' (Y1a-Y1a' and Y1b-Y1b') are orthogonal and an intersection thereof becomes a center portion 109 (109a to 109d) of each receiving antenna. Although the shape of the receiving antenna 108 is not limited to this, the center portions 109 of the receiving antennas arrayed in the same direction may be constituted on a straight line.

In other words, the plurality of receiving antennas 108 are arrayed in the horizontal direction (first direction) and the vertical direction (second direction) crossing the horizontal direction. In the present embodiment, the horizontal direction (first direction) and the vertical direction (second direction) cross perpendicularly. Thereby, positions of a target object (object) in the two directions can be detected.

In the present embodiment, the receiving channels to which the receiving antennas 108a to 108d have been connected are respectively described as receiving channels 1 to 4.

Range is a relative distance of the target object and Rate is a relative speed of the target object. Range and Rate are calculated in each receiving channel and are extracted by the number of receiving channels used. Therefore, values of Range and Rate are used by averaging the values extracted from each receiving channel. XRNG (XRNG1 and XRNG2) is a horizontal direction distance of the target object and is calculated from a horizontal direction detection angle (hereinafter, referred to as a horizontal angle) and Range. The horizontal angle is calculated from a reception phase difference of the electromagnetic waves input to the receiving antennas arrayed in the horizontal direction. Height (Height1 and Height2) is a vertical direction distance of the target object and is calculated from a vertical direction detection angle (hereinafter, referred to as a vertical angle) and Range. The vertical angle is calculated from a reception phase difference of the electromagnetic waves input to the receiving antennas arrayed in the vertical direction.

In the configuration of FIG. 6, a combination of a receiving channel 1 (ch1) and a receiving channel 2 (ch2) and a combination of a receiving channel 3 (ch3) and a receiving channel 4 (ch4) receive a reflected wave, so that it is possible to extract two horizontal angles of the target object. Horizontal direction distances calculated from the horizontal angles extracted from the combination of the receiving channel 1 (ch1) and the receiving channel 2 (ch2) and the combination of the receiving channel 3 (ch3) and the receiving channel 4 (ch4) are respectively XRNG1 and XRNG2.

Similarly, a combination of a receiving channel 1 (ch1) and a receiving channel 4 (ch4) and a combination of a receiving channel 2 (ch2) and a receiving channel 3 (ch3) receive a reflected wave, so that it is possible to extract two vertical angles of the target object, and vertical direction distances calculated therefrom are respectively Height1 and Height2.

That is, in the configuration of FIG. 6, if all the receiving channels are used, it is possible to extract a relative distance, a relative speed, two horizontal angles, and two vertical angles for one target object per frame. Generally, the radar device 1 cyclically repeats an operation of transmitting and receiving the electromagnetic wave and calculating a detection result of the target object. Here, one processing cycle is called a frame.

The accuracy of the two detection angles extracted by the radar device 1 in each frame increases or decreases due to an influence of reflection, but the accuracy is equivalent on average. Therefore, as a comparative example, there is an advantage of being less affected by a reflection environment as compared with a radar device in which receiving antennas of three elements are disposed in an L shape and the receiving antennas are arrayed in the horizontal direction and the vertical direction.

FIG. 7 shows that performance and load are in a trade-off relation according to the number of channels used, in a radar device according to a second embodiment of the present invention. Fr in the drawing means a frame.

If the number of receiving channels used to calculate information increases, performance of detection information is also improved, but load also increases. Further, if the number of receiving channels used decreases, the load decreases, but radar performance also decreases. Therefore, it is possible to achieve both the performance and the load by selecting the number of receiving channels to be used according to the required radar performance.

For example, in the configuration of FIG. 6, the radar performance and the processing load when the information is extracted using all the receiving channels correspond to an item of the number of channels used 4 in FIG. 7.

Further, FIG. 7 shows that, in the receiving antenna of FIG. 6, for example, when the number of channels used is 3, three distances (relative distances) per frame, three speeds (relative speeds) per frame, one horizontal detection angle (horizontal angle) per frame, and one vertical detection angle (vertical angle) per frame can be detected.

(Operation when Number of Channels Used is 3)

Figure 8A:
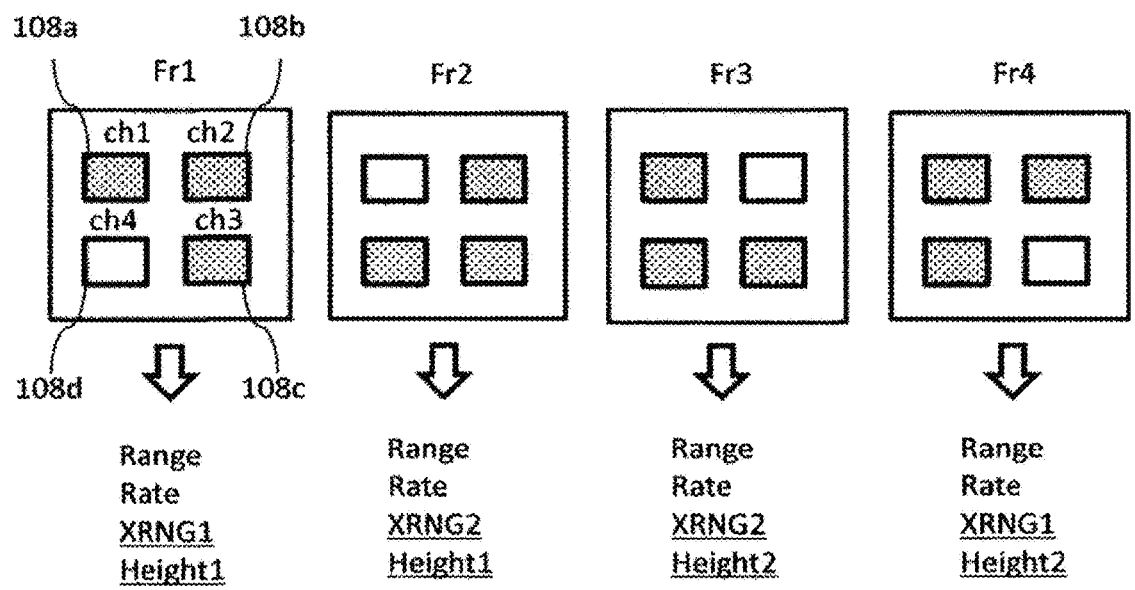
FIG. 8A is an explanatory diagram showing an example of a regular combination of receiving channels per frame when three receiving channels are used in accordance with a second embodiment of the present invention.

FIG. 8A shows a method of selecting the receiving channels to be used from all the receiving channels and regularly changing a combination thereof for each frame, in the receiving antenna configuration of FIG. 6. In FIG. 8A, receiving channels to which white receiving antennas have been connected are receiving channels that are not used in frames Fr1 to Fr4.

Figure 8B:
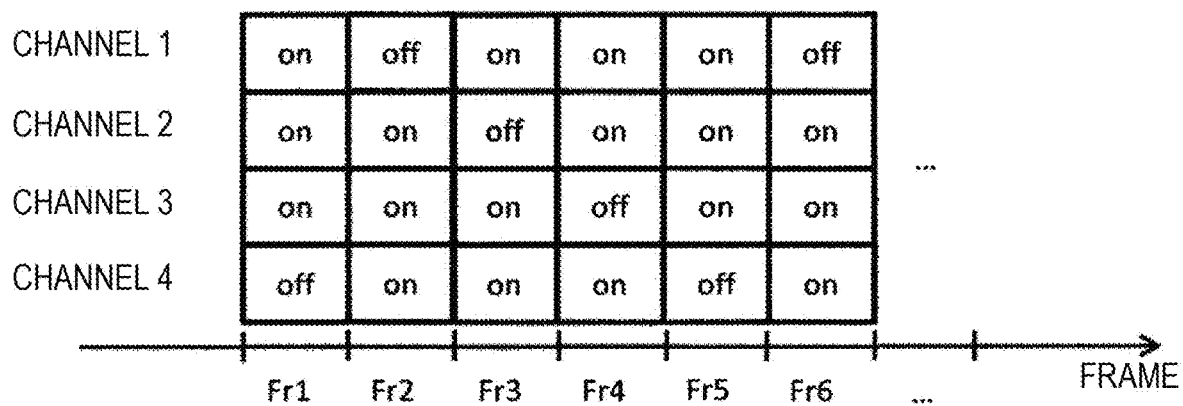
FIG. 8B is a diagram showing on/off states of receiving channels in each frame.

In this example, the three receiving channels are selected. FIG. 8B is a diagram showing that combinations of the receiving channels of the respective frames are regularly changed from the frame Fr1 to the frame Fr4 and this is repeated cyclically. In the frame Fr1, a horizontal angle is extracted from the receiving channel 1 (ch1) and the receiving channel 2 (ch2), and a vertical angle is extracted from the receiving channel 2 (ch2) and the receiving channel 3 (ch3). The receiving channels for extracting the horizontal angles are different between the frames Fr1 and Fr4 and the frames Fr2 and Fr3, and the receiving channels for extracting the vertical angles are different between the frames Fr1 and Fr2 and the frames Fr3 and Fr4. The radar performance and the load at this time conform to an item of the number of channels used 3 in FIG. 7.

In other words, in the frame Fr1 (first frame), the signal processing unit 103 processes a second signal Sig2 corresponding to a combination (108a, 108b, and 108c) of receiving antennas including the two receiving antennas (108a and 108b) arrayed in the horizontal direction (first direction), and in a next frame Fr2 (second frame) of the frame Fr1, the signal processing unit 103 processes a second signal Sig2 corresponding to a combination (108b, 108c, and 108d) of receiving antennas including the two receiving antennas (108b and 108c) arrayed in the vertical direction (second direction).

Specifically, in the frame Fr1 (first frame), the signal processing unit 103 processes a second signal Sig2 corresponding to a first combination (108a, 108b, and 108c) of three receiving antennas and calculates a first angle of the target object (object) with respect to the horizontal direction (first direction) and a second angle of the target object with respect to the vertical direction (second direction). In the frame Fr2 (second frame), the signal processing unit 103 processes a second signal Sig2 corresponding to a second combination (108b, 108c, and 108d) of three receiving antennas and calculates a third angle of the target object with respect to the horizontal direction and a fourth angle of the target object with respect to the vertical direction.

In the present embodiment, the second angle and the fourth angle are the same.

By selecting the three channels from all the receiving channels, it is possible to extract the relative distance Range (for example, the average value of the three relative distances), the relative speed Rate (for example, the average value of the three relative speeds), one horizontal angle, and one vertical angle with respect to one target object in each frame. The information amount of the detection angle for each frame is reduced. However, by implementing the combinations of the frames Fr1 to Fr4, the same result as the case of using the four receiving channels is extracted. That is, it can be said that the radar performance of the four receiving channels is calculated (achieved) by time division. In order to time-divide the radar performance of the four channels, combinations of the channels not to be used are determined so that there is no bias.

As a result, the data amount becomes ¾ and the processing load is also reduced as compared with the case where the four receiving channels are used. Therefore, a time per frame can be shortened.

As described above, according to the present embodiment, the receiving channels to be used and the combinations thereof are appropriately selected from the receiving channels constituting the radar device and the combinations are regularly changed. As a result, it is possible to provide a radar device in which the received data amount, the processing amount, the cost, and the power consumption are reduced with the same radar performance as the original number of receiving channels.

(Failure Determination)

Figure 9:
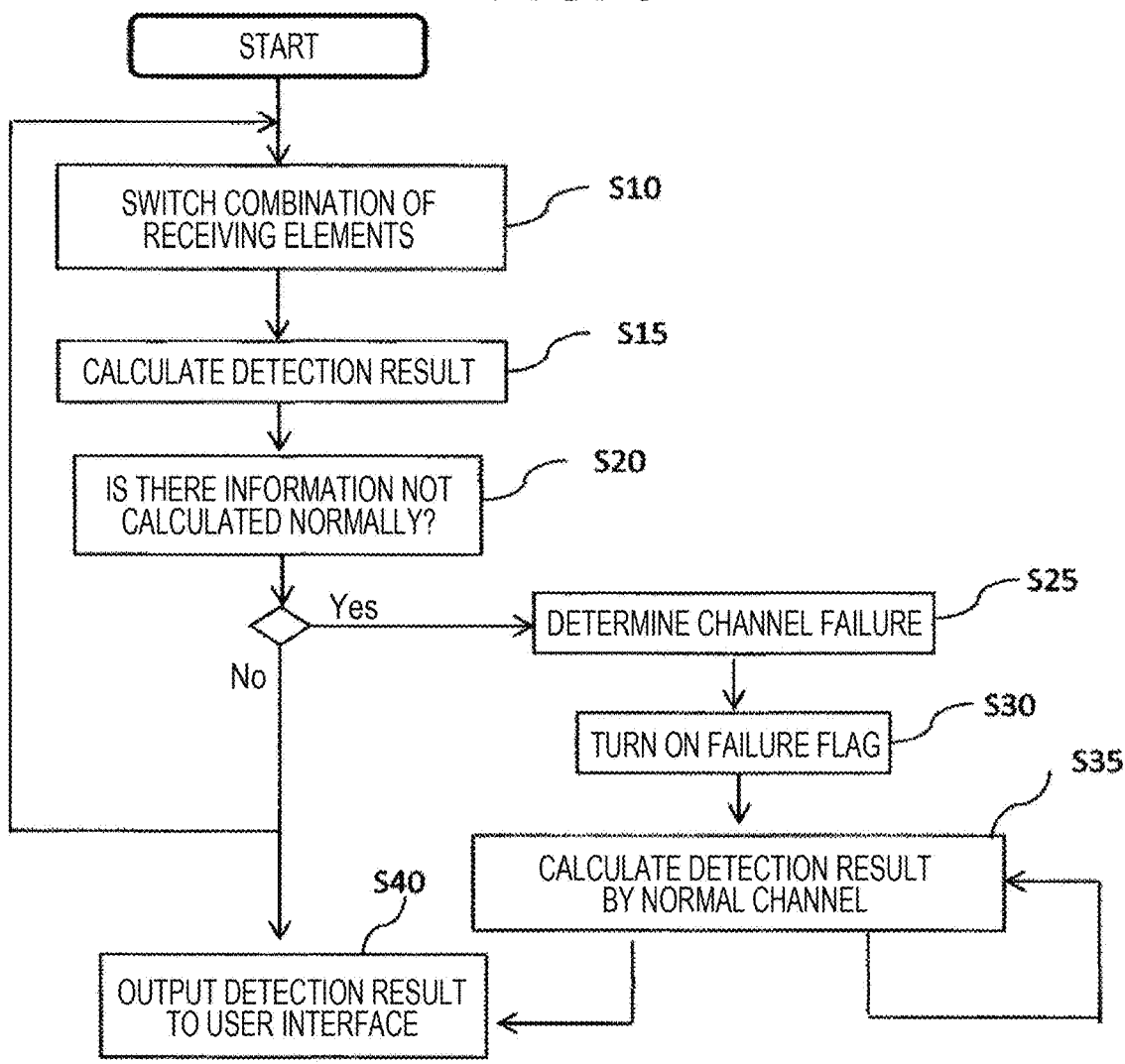
FIG. 9 is a flow diagram of processing for determining a receiving channel failure in accordance with all embodiments of the present invention.

FIG. 9 is an example of a flow of processing for ensuring functional safety. As shown in FIG. 9, processing for determining a failure of the receiving channel may be included.

The signal processing unit 103 regularly switches the combination of the receiving channels (receiving elements) (S10). The signal processing unit 103 calculates Range, Rate, XRNG1 and 2, and Hight1 and 2 (detection results) (S15). The signal processing unit 103 determines whether there is information not normally calculated, from a comparison between information (detection result) calculated in a certain frame and information calculated in a previous frame (S20). When there is the information not calculated normally, the signal processing unit 103 detects (determines) a failure of the receiving channel (S25). The signal processing unit 103 turns on a failure flag indicating the failure of the receiving channel (S30). The signal processing unit 103 repeats processing for calculating the detection result in the receiving channel (normal channel) in which the failure is not detected (S35). Further, the signal processing unit 103 outputs the detection result calculated in the normal channel to the user interface 105 (vehicle navigation system or the like) (S40).

For example, when any part of the receiving channel 2 fails between the frames Fr1 and Fr2 in FIG. 8A, the information of Height1 of the frame Fr2 is not correctly extracted. It is determined whether or not the extracted information is correct by comparing the frame Fr1 and Height1 of the frame Fr2 and the failure determination is performed. Thereby, functional safety can be ensured.

In other words, the signal processing unit 103 compares the processing result in the first frame (for example, the frame Fr1) with the processing result in the second frame (for example, the frame Fr2), thereby performing the failure determination of the receiving channel (for example, ch2) indicating the path from each receiving antenna 108 (for example, 108b) to the signal processing unit 103. Thereby, reliability of the radar device 1 can be improved.

This is not limited to the receiving antenna configuration of FIG. 6 and the combinations of the receiving channels of FIG. 8, and is effective in the case of regularly changing the combinations of the channels as in the embodiment of the present invention. After the failure determination, information is extracted using the normal receiving channel without using the failed receiving channel.

In other words, the signal processing unit 103 generates, from the second signal Sig2 corresponding to the non-failed receiving channel 108, a combination of the second signal Sig2 to be processed for each frame. Thereby, detection of the position of the object can be continuously performed.

Third Embodiment

Figure 10:
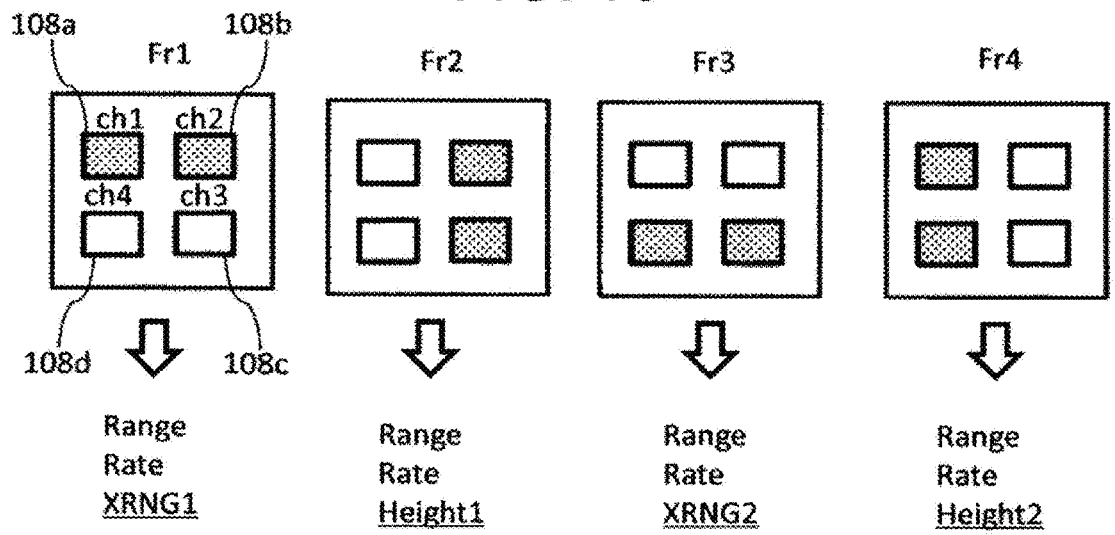
FIG. 10 is an explanatory diagram showing a combination of receiving channels per frame when two receiving channels are used in accordance with a third embodiment of the present invention.

In FIG. 10, in a receiving antenna configuration of FIG. 6, two receiving channels are selected and a combination of channels to be received for each frame is regularly changed from Fr1 to Fr4, which is repeated. In the frame Fr1, a receiving channel 1 (ch1) and a receiving channel 2 (ch2) are used and only a relative distance, a relative speed, and a horizontal angle are extracted. In the frame Fr2, a receiving channel 2 (ch2) and a receiving channel 3 (ch3) are used and only a relative distance, a relative speed, and a vertical angle are extracted. Radar performance and load at this time correspond to an item of the number of channels used 2 in FIG. 7.

In other words, a plurality of receiving antennas 108 are four and are arrayed in 2 rows and 2 columns. A signal processing unit 103 processes a second signal Sig2 corresponding to a combination (108a and 108b) of two receiving antennas arrayed in a horizontal direction (first direction) and calculates an angle of a target object (object) with respect to the horizontal direction, in the frame Fr1 (first frame). Further, the signal processing unit 103 processes a second signal Sig2 corresponding to a combination (108b and 108c) of two receiving antennas arrayed in a vertical direction (second direction) and calculates an angle of the target object with respect to the vertical direction, in the frame Fr2 (second frame).

When the two receiving channels are selected, the relative distance Range and the relative speed Rate are extracted for one target object in each frame. In addition, one horizontal angle and one vertical angle are alternately extracted for each frame. That is, since the horizontal angle and the vertical angle are extracted every other frame, position accuracy of the target object decreases.

Conventionally, only a detection angle of a single direction is extracted in received signals of two receiving channels. However, in the embodiment of the present invention, detection angles of two directions can be extracted in the received signals of the two receiving channels. In addition, by implementing the combinations of the receiving channels from the frame Fr1 to the frame Fr4, it becomes equal to information extracted in the case of using four receiving channels. That is, it is synonymous with lengthening a cycle of the above time division.

In the above channel selection, either the horizontal angle or the vertical angle is not extracted in each frame. Therefore, follow-up processing may be performed to determine the identity of a detection object between the respective frames.

The follow-up processing is processing for determining whether the target object detected in each frame is the same target object. For example, when a target object A detected in a frame has a relative distance of 100 m and a relative speed of 0 m/s, a target object B detected in a next frame has a relative distance of 100 m and a relative speed of 0 m/s, and a target object C has a relative distance of 150 m and a relative speed of 10 m/s, it can be estimated that the target object A and the target object B are the same. It is possible to complement information not calculated by linking with the information of the target object detected in the past by such a method. For example, it is assumed that the information not calculated is the same as the result of the past frame.

Fourth Embodiment

A method of selecting receiving channels and regularly changing a combination thereof is also applicable to a receiving antenna configuration of M×N receiving channels including M and N (M and N>2) receiving antennas respectively arrayed in horizontal and vertical directions. Here, the same as the embodiments is omitted.

In other words, a plurality of receiving antennas 108 (108a to 108f) are arrayed in M rows and N columns (M and N: natural number of 2 or more).

Figure 11:
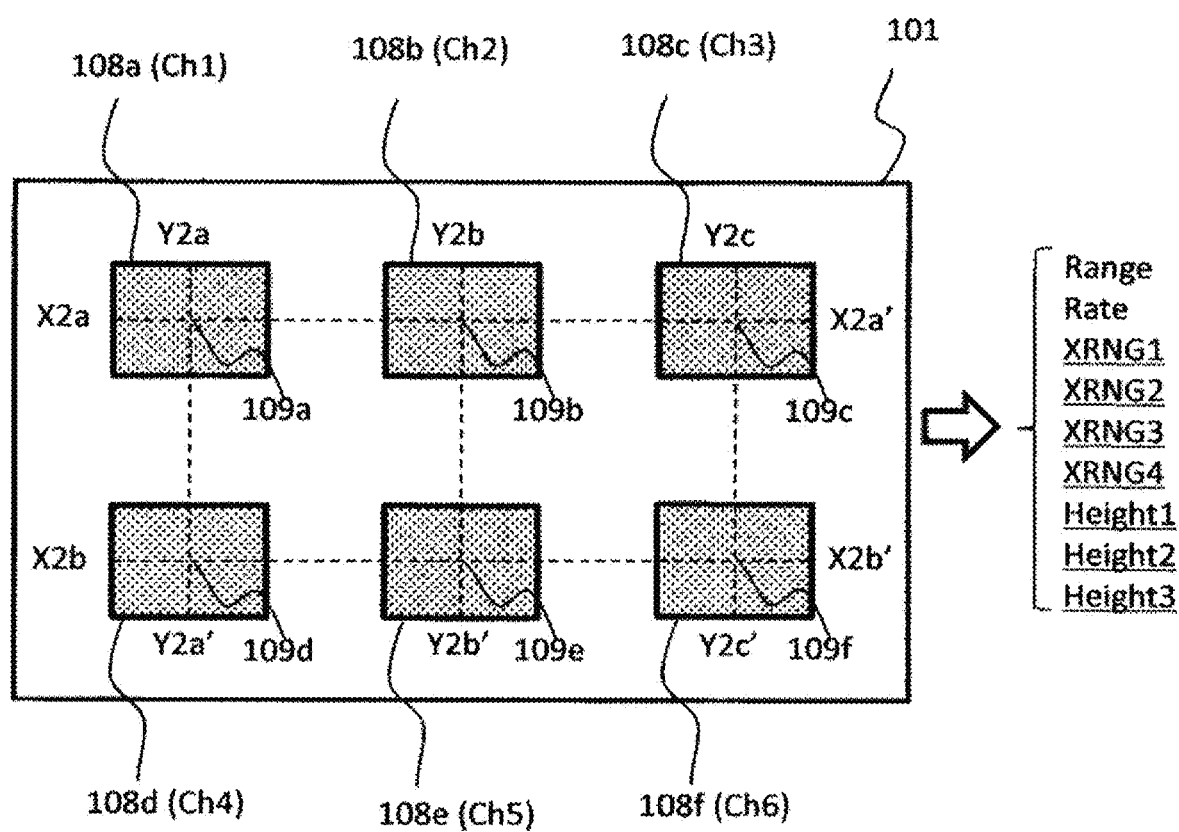
FIG. 11 is an explanatory diagram showing a configuration of a receiving antenna according to a fourth embodiment of the present invention.

As an example, FIG. 11 is diagram showing a radar device 1 having six receiving channels in which receiving antennas of three elements are disposed in a horizontal direction and receiving antennas of two elements are disposed in a vertical direction, as viewed from a top surface of the antenna. Here, the same as the second embodiment is omitted. X2a-X2a' and X2b-X2b' are parallel and Y2a-Y2a', Y2b-Y2b', and Y2c-Y2c' are parallel. Further, X2-X2' (X2a-X2a' and X2b-X2b') and Y2-Y2' (Y2a-Y2a', Y2b-Y2b', and Y2c-Y2c') are orthogonal. However, the receiving antenna configuration in the present embodiment is not limited to this and center portions 109 (109a to 109f) of the antennas arrayed in the same direction are arrayed linearly.

In the present embodiment, the receiving channels to which the receiving antennas 108a to 108f have been connected are respectively described as receiving channels 1 to 6.

In the configuration of FIG. 11, if the respective receiving antennas 108 receive the electromagnetic waves reflected by all the receiving channels and signal processing is performed, four horizontal angles are extracted from combinations of the receiving channels in which the receiving channel 1 (ch1) and the receiving channel 2 (ch2), the receiving channel 2 (ch2) and the receiving channel 3 (ch3), the receiving channel 4 (ch4) and the receiving channel 5 (ch5), and the receiving channel 5 (ch5) and the receiving channel 6 (ch6) have been connected, and XRNG1, XRNG2, XRNG3, and XRNG4 are calculated.

Similarly, three vertical angles are extracted from combinations of the receiving channels in which the receiving channel 1 (ch1) and the receiving channel 4 (ch4), the receiving channel 2 (ch2) and the receiving channel 5 (ch5), and the receiving channel 3 (ch3) and the receiving channel 6 (ch6) have been connected, and Height1, Height2, and Height3 are calculated.

In addition to the above combinations, horizontal angles may be extracted from the receiving channel 1 (ch1) and the receiving channel 3 (ch3) and the receiving channel 4 (ch4) and the receiving channel 6 (ch6).

Figure 12:
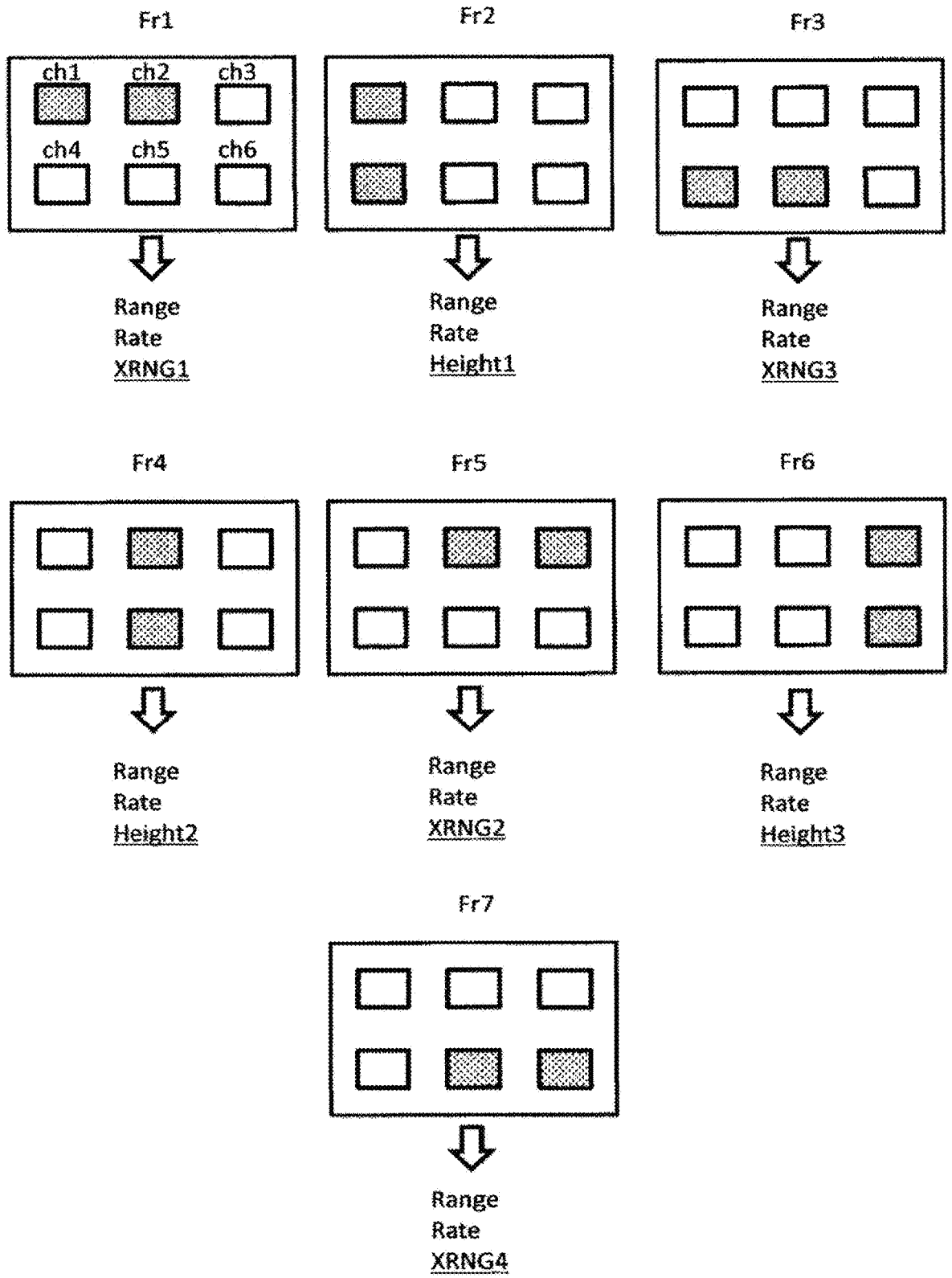
FIG. 12 is an explanatory diagram showing an example of a regular combination of receiving channels per frame when two receiving channels are used in accordance with a fourth embodiment of the present invention.

In FIG. 12, in the radar device 1 having the receiving antenna configuration of FIG. 11 as an example of the present embodiment, similar to the second embodiment, two receiving channels are selected in each of the frames Fr1 to Fr7 and a combination thereof is regularly changed from Fr1 to Fr7, which is repeated. When the combination of receiving channels to be used is determined, as long as there is no reason such as a failure of the receiving channel, a bias is prevented from occurring in the channels not to be used, similar to the above embodiment.

When the two channels are selected as shown in FIG. 12, for example, like the receiving channel 1 (ch1) and receiving channel 2 (ch2) in the frame Fr1 and the receiving channel 1 (ch1) and the receiving channel 4 (ch4) in the frame Fr2, the horizontal angle and the vertical angle are alternately extracted for each frame and the receiving channels to be used are determined. This is to avoid missing of information of the target object over a long time.

In other words, a signal processing unit 103 processes a second signal Sig2 corresponding to a combination of receiving antennas including the two receiving antennas (for example, 108a and 108b) arrayed in any row of M rows, in the frame Fr1 (first frame). The signal processing unit 103 processes a second signal Sig2 corresponding to a combination of receiving antennas including the two receiving antennas (for example, 108a and 108d) arrayed in any column of N columns, in the frame Fr2 (second frame). Thereby, positions of the target object (object) in the two directions can be alternately detected.

Depending on an environment, for example, when it is determined that it is better to calculate only the horizontal angle to improve accuracy, only the same direction (horizontal direction) may be calculated over several frames. This determination may be made from map information, for example. Specifically, this corresponds to the case where it is flat and the height of the target object does not need to be measured.

When three or more receiving channels to be used are selected and combined, the receiving channels need to be combined so that the detection angles in the two directions can be calculated. That is, in a combination of the receiving channel 1 (ch1), the receiving channel 2 (ch2), and the receiving channel 3 (ch3) and a combination of the receiving channel 4 (ch4), the receiving channel 5 (ch5), and the receiving channel 6 (ch6), since the vertical angle is extracted, these combinations are excluded. This is to prevent missing of information of the target object.

The number of receiving channels to be used can be determined according to the environment, for example. Optimal radar performance and load according to a scene can be achieved by judgment criteria such as a traffic variation, a distance to the target object, and a high or low travelling speed. For example, in an environment where traffic is low and the target object is far away, high radar performance is not required. Therefore, by setting the number of receiving channels used to two, the radar performance may be decreased and the processing load may be decreased. The same is applicable to the third embodiment and the fourth embodiment.

In other words, the signal processing unit 103 changes the number of receiving channels to be blocked, according to the surrounding environment of the radar device 1.

In the present embodiment, although the method of calculating the detection angle is described on the premise of a mono-pulse system, other calculation methods may be used. For example, a calculation method such as a MUSIC method may be used.

Modifications

Figure 13A:
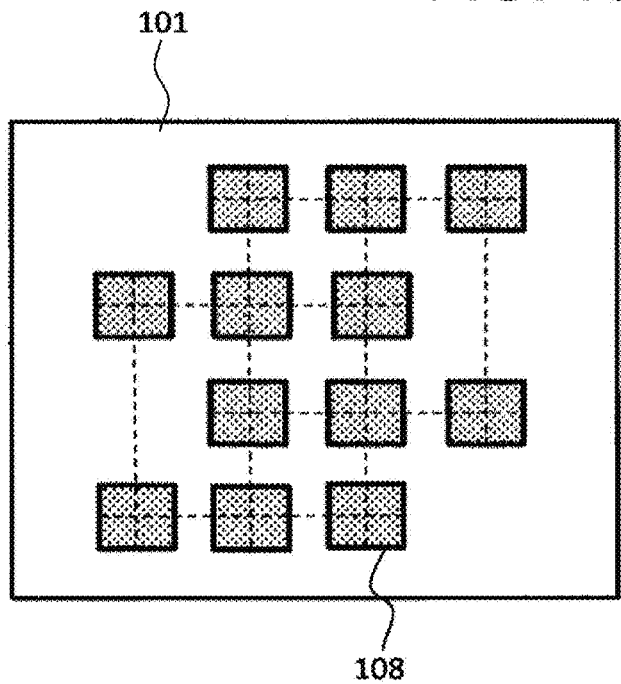
FIG. 13A is a diagram showing a modification of a receiving antenna configuration of a radar device according to a modification of an embodiment of the present invention.
Figure 13B:
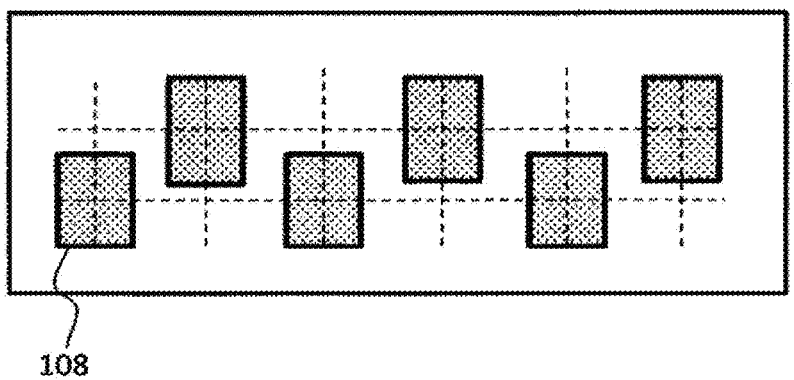
FIG. 13B is a diagram showing a modification of a receiving antenna configuration of a radar device according to a modification of an embodiment of the present invention.
Figure 13C:
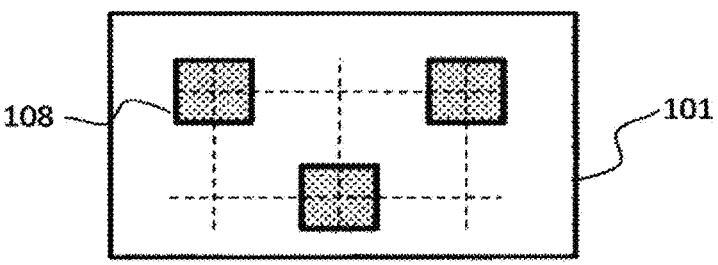
FIG. 13C is a diagram showing a modification of a receiving antenna configuration of a radar device according to a modification of an embodiment of the present invention.

FIGS. 13A to 13C show an example of a receiving antenna configuration (arrangement) of a radar device 1 according to a modification of an embodiment of the present invention. The contents described in each embodiment can also be implemented in a configuration in which a row of receiving antennas is shifted in the horizontal direction or the vertical direction as shown in FIG. 13A, a configuration in which the receiving antennas of the horizontal direction and the vertical direction are alternately arrayed as shown in FIG. 13B, and a receiving antenna configuration in which a first direction where the receiving antennas are arrayed and a second direction of the receiving antennas crossing the first direction do not cross perpendicularly. In the receiving antenna configuration shown in FIG. 13B, angle information is not necessarily calculated in the horizontal direction and the vertical direction with respect to the ground. However, from the calculated angle information of the two directions, the angle information can be recalculated in the horizontal direction and the vertical direction with respect to the ground.

Fifth Embodiment

A method of selecting receiving channels and regularly changing a combination thereof is also applicable to a receiving antenna configuration in which a plurality of receiving antennas are configured in a single direction. At this time, the same as the above embodiments is omitted.

Figure 14:
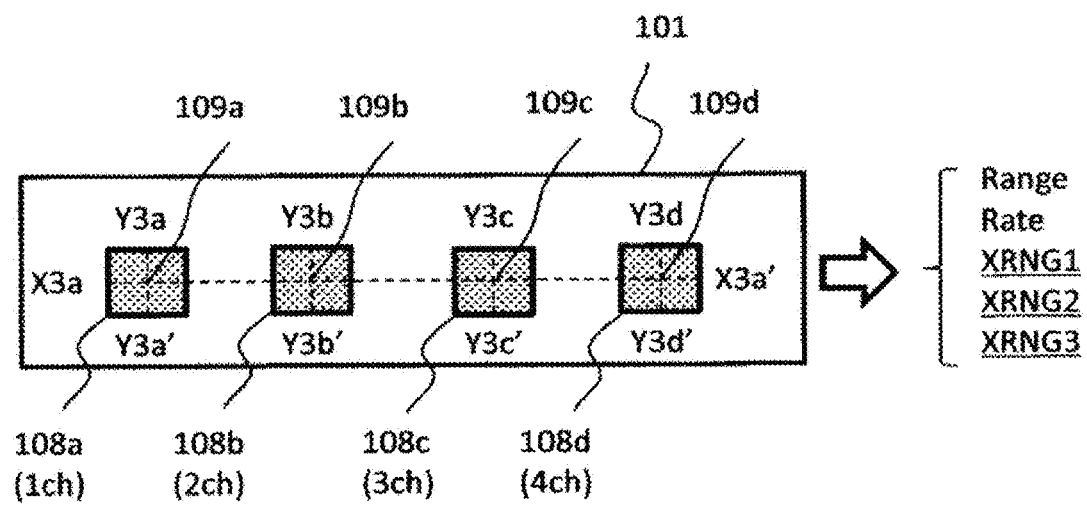
FIG. 14 is an explanatory diagram showing a receiving antenna configuration according to a fifth embodiment of the present invention.

As an example, FIG. 14 is diagram showing a radar device 1 having four receiving channels in which receiving antennas of four elements are disposed in a horizontal direction, as viewed from a top surface (front) of the antenna. The receiving channels to which receiving antennas 108a to 108d have been connected are respectively described as a receiving channel 1 (ch1) to a receiving channel 4 (ch4).

The receiving channels in which a combination of the receiving channel 1 (ch1) and the receiving channel 2 (ch2), a combination of the receiving channel 2 (ch2) and the receiving channel 3 (ch3), and a combination of the receiving channel 3 (ch3) and the receiving channel 4 (ch4) have been connected receive a reflected wave, so that it is possible to extract three horizontal angles of a target object.

Horizontal direction distances calculated from the horizontal angles extracted from the combination of the receiving channel 1 (ch1) and the receiving channel 2 (ch2), the combination of the receiving channel 2 (ch2) and the receiving channel 3 (ch3), and the combination of the receiving channel 3 (ch3) and the receiving channel 4 (ch4) are respectively XRNG1, XRNG2, and XRNG3. The receiving antenna configuration according to the present embodiment is not limited to this and is applicable even when a plurality of receiving antennas are configured in the vertical direction.

Figure 15:
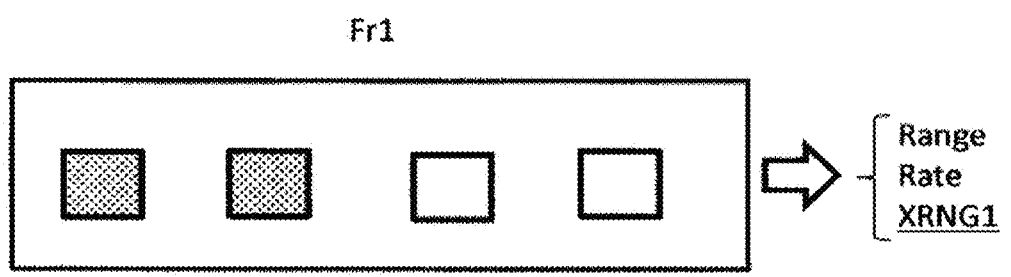
FIG. 15 is an explanatory diagram showing an example of a regular combination of receiving channels per frame when two receiving channels are used in accordance with a fifth embodiment of the present invention.
Figure 15:
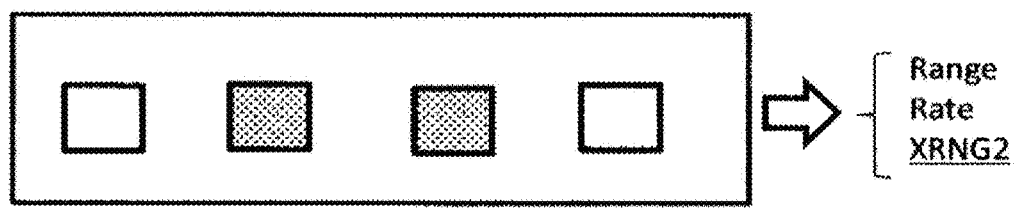
Figure 15:
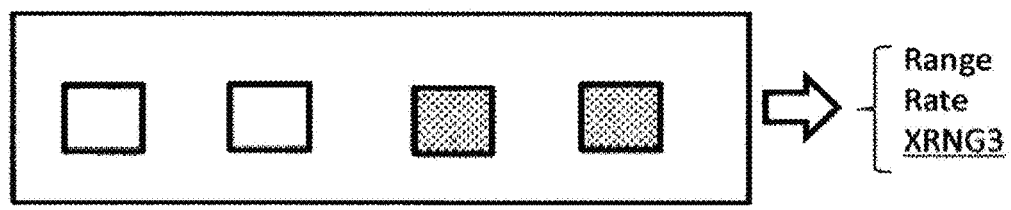

In FIG. 15, in the radar device 1 having the receiving antenna configuration in the horizontal direction of FIG. 14 as an example of the present embodiment, similar to the embodiment, two receiving channels are selected in each frame and a combination thereof is regularly changed from the frame Fr1 to the frame Fr3, which is repeated.

The receiving channels used to extract the horizontal angle in each frame are different and an amount of data acquired by combining the receiving channels for one cycle becomes equivalent to an amount of data acquired by using all the channels. By reducing the number of channels used for reception, load per frame can be reduced.

By reducing the number of channels, the number of divisions of target objects existing at the same distance and speed can be reduced. Therefore, similar to the above embodiments, it is desirable to select the number of channels used, according to the environment, for example, a road situation.

[Output to User Interface]

Figure 16:
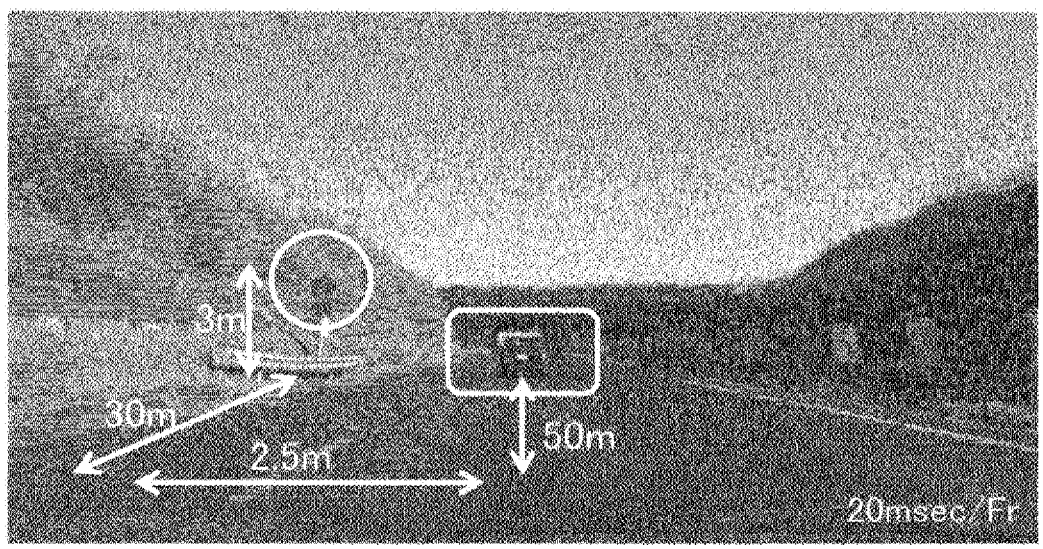
FIG. 16 is an explanatory diagram showing an embodiment when information calculated by a radar device according to each of first to fifth embodiments (all embodiments) of the present invention is output to a user interface.

FIG. 16 is a diagram showing an example in which information calculated by the radar device 1 according to each of the first to fifth embodiments of the present invention is output to the user interface 105.

The signal processing unit 103 may input information of preceding vehicles or upper target objects (signs, drones, or the like) extracted by switching the receiving channels for each frame to the user interface 105 and may display the information on the user interface 105 (for example, a vehicle navigation system, a head-up display (HUD), or the like). In addition, the information may be input to the vehicle control unit 106 (vehicle control CPU) or an in-vehicle camera to support vehicle control or travelling control.

The present invention is not limited to the embodiments described above and various modifications are included. For example, the embodiments are described in detail to facilitate the understanding of the present invention and are not limited to including all of the described configurations. Further, a part of the configurations of the certain embodiment can be replaced by the configurations of other embodiments or the configurations of other embodiments can be added to the configurations of the certain embodiment. Further, for a part of the configurations of the individual embodiments, addition of other configurations, configuration removal, and configuration replacement can be performed.

Further, a part or all of the individual configurations and functions may be designed by integrated circuits and may be realized by hardware. Further, the individual configurations and functions may be realized by software by analyzing programs for realizing the functions by a processor (microcomputer or the like) and executing the programs by the processor. Information such as the programs, the tables, and the files for realizing the individual functions may be stored in a recording device such as a memory, a hard disk, and a solid state drive (SSD) or a recording medium such as an IC card, an SD card, and a DVD.

The embodiments of the present invention may take the following aspects.

(1) A radar device includes one or more transmitting antennas which transmit a signal at predetermined timing; and one or more receiving channels. The receiving channel includes one or more receiving antennas which receive a reflected signal from an external object reflecting the transmitted signal, a receiving circuit to which the received signal is input, and a signal processing unit which processes the received signal, and has a function of invalidating one or more functions among the receiving antenna, the receiving circuit, and the signal processing unit. The receiving antenna is configured to be disposed in a first direction and disposed in a second direction crossing the first direction, and operates any receiving channel for every series of frame periods in which the signal is transmitted and received and the signal is processed.

(2) The radar device of (1) includes a transmitting antenna which transmits a signal and a receiving antenna which receives the signal in a predetermined frame. The receiving antenna has receiving antennas arrayed in the first direction, that is, a horizontal direction of the radar device and receiving antennas arrayed in the second direction crossing the first direction perpendicularly, that is, a vertical direction of the radar device. A combination of the receiving channels for processing the signal is different according to the frame.

(3) In the radar device of (1), the receiving antennas has a horn lens antenna configuration including a patch antenna, a horn antenna, and a dielectric lens to convert an electromagnetic wave radiated from the horn antenna into a plane wave.

(4) In the radar device of (2), the receiving antenna includes four receiving antennas in which receiving antennas of two elements are disposed in the first direction and receiving antennas of two elements are disposed in the second direction orthogonal to the first direction.

(5) In the radar device of (4), three receiving channels for processing the signal are selected and processing is performed.

(6) In the radar device of (4), two receiving channels for processing the signal are selected and processing is performed.

(7) In the radar device of (1), a combination of receiving channels for processing the signal is repeated at any cycle (8) The radar device of (1) has a function of performing a failure determination of the receiving channel from a detection result of the radar device in the frame and ensuring functional safety.

(9) In the radar device of (7), angle information of horizontal and vertical directions of a target object with respect to a ground is calculated from angle information of the target object in the first direction and angle information of the target object in the second direction and the angle information is alternately calculated in the frame.

(9) In the radar device of (7), angle information of horizontal and vertical directions of a target object with respect to a ground is calculated from angle information of the target object in the first direction and angle information of the target object in the second direction and the angle information is obtained by continuously calculating angle information in any direction for any interval in the frame.

(10) A radar device includes one or more transmitting antennas which transmit a signal and one or more receiving antennas which receives the signal in a predetermined frame. The receiving antenna has three or more receiving antennas arrayed in a predetermined single direction. A combination of receiving channels for processing the signal is different according to the frame.

(11) In the radar device of (10), a combination of receiving channels for processing the signal is repeated at any cycle

(12) In the radar device of (10), the receiving antenna includes four receiving antennas of four elements which are arrayed in the predetermined single direction.

(13) In the radar device of (12), two receiving channels for processing the signal are selected and processing is performed.

According to (1) to (13) described above, the receiving channels to be used and the combinations thereof are appropriately selected from the receiving channels constituting the radar device and the combinations are regularly changed. As a result, it is possible to provide a radar device in which the received data amount, the processing amount, the cost, and the power consumption are reduced with the same radar performance as the original number of receiving channels.

REFERENCE SIGNS LIST

101 receiving antenna unit
102 receiving circuit unit 103 signal processing unit
104 switching signal
105 user interface
106 vehicle control unit
520 receiving circuit
108 receiving antenna
109 center portion of receiving antenna
10 intersection of optical axis of dielectric lens and first surface of dielectric substrate
100 dielectric substrate
110 radiating unit
120 conductor portion
130 conductor portion
200 horn
300 dielectric lens
400 through-hole
521 input terminal

The invention claimed is:

1. A radar device, comprising:
a transmitting antenna configured to transmit an electromagnetic wave;
a plurality of receiving antennas configured to receive a reflected wave from an object reflecting the electromagnetic wave, and each of the plurality of receiving antennas configured to convert a corresponding reflected wave into a corresponding of the first signals;
a plurality of receiving circuits which are respectively connected to the receiving antennas, and each of the plurality of receiving circuits configured to generate a corresponding second signal from a corresponding of the first signals; and
a signal processor configured to process the second signals, wherein
the plurality of receiving antennas are arrayed in a first direction and a second direction crossing the first direction, and
the signal processor is configured to switch a combination of the respective second signals to be processed, for each frame indicating a time period extending from when the transmitting antenna transmits the electromagnetic wave to when the signal processor processes the respective second signals.

2. The radar device according to claim 1, wherein the signal processor is configured to:
process the second signals corresponding to a combination of the receiving antennas including two receiving antennas arrayed in the first direction, in a first frame, and
process the second signals corresponding to a combination of the receiving antennas including two receiving antennas arrayed in the second direction, in a second frame following the first frame.

3. The radar device according to claim 2, wherein the first direction and the second direction cross perpendicularly.

4. The radar device according to claim 3, wherein the plurality of receiving antennas are arrayed in M rows and N columns (M and N: natural number of 2 or more), and the signal processor is configured to:
process the second signals corresponding to a combination of the receiving antennas including two receiving antennas arrayed in any row of the M rows, in the first frame, and
process the second signals corresponding to a combination of the receiving antennas including two receiving antennas arrayed in any column of the N columns, in the second frame.

5. The radar device according to claim 4, wherein the plurality of receiving antennas are four and are arrayed in 2 rows and 2 columns.

6. The radar device according to claim 5, wherein the signal processor is configured to:
process the second signals corresponding to a combination of the two receiving antennas arrayed in the first direction and calculate an angle of the object with respect to the first direction, in the first frame, and
process the second signals corresponding to a combination of the two receiving antennas arrayed in the second direction and calculate an angle of the object with respect to the second direction, in the second frame.

7. The radar device according to claim 5, wherein the signal processor is configured to:
process the second signals corresponding to a first combination of three receiving antennas and calculate a first angle of the object with respect to the first direction and a second angle of the object with respect to the second direction, in the first frame, and
process the second signals corresponding to a second combination of three receiving antennas and calculate a third angle of the object with respect to the first direction and a fourth angle of the object with respect to the second direction, in the second frame.

8. The radar device according to claim 2, wherein the signal processor is configured to compare a processing result in the first frame and a processing result in the second frame and perform a failure determination of receiving channels indicating paths from the respective receiving antennas to the processor.

9. The radar device according to claim 8, wherein the signal processor is configured to generate a combination of the respective second signals to be processed for each frame, from the second signals corresponding to a receiving channel which has been determined to not have failed.

10. The radar device according to claim 1, wherein each of the receiving antennas has:
a patch antenna configured to radiate the electromagnetic wave,
a horn antenna which surrounds the patch antenna, and
a dielectric lens which is disposed in an opening end of the horn antenna and
converts the electromagnetic wave into a plane wave.

11. The radar device according to claim 1, wherein the signal processor is configured to block at least one of receiving channels indicating paths from the respective receiving antennas to the signal processor and switch a combination of the second signals to be processed, for each frame.

12. The radar device according to claim 11, wherein the signal processor is configured to:
change the number of receiving channels to be blocked, according to a surrounding environment of the radar device.

* * * * *